United States Patent
Färber et al.

(10) Patent No.: US 12,384,926 B2
(45) Date of Patent: Aug. 12, 2025

(54) MULTILAYER COLOR AND/OR EFFECT GIVING COATING AND METHOD OF FORMING A BASECOAT LAYER

(71) Applicant: PPG ADVANCED SURFACE TECHNOLOGIES, LLC, New Albany, OH (US)

(72) Inventors: Peter Färber, Gärtringen (DE); Heiko Veth, Denkendorf (DE); Helge Warta, Ditzingen (DE)

(73) Assignee: PPG Advanced Surface Technologies, LLC, New Albany, OH (US)

( * ) Notice: Subject to any disclaimer, the term of this patent is extended or adjusted under 35 U.S.C. 154(b) by 977 days.

(21) Appl. No.: 17/056,689

(22) PCT Filed: Apr. 8, 2019

(86) PCT No.: PCT/EP2019/058820
§ 371 (c)(1),
(2) Date: Nov. 18, 2020

(87) PCT Pub. No.: WO2019/219297
PCT Pub. Date: Nov. 21, 2019

(65) Prior Publication Data
US 2021/0198499 A1 Jul. 1, 2021

(30) Foreign Application Priority Data
May 18, 2018 (DE) .......................... 102018207815.7

(51) Int. Cl.
*C09D 5/36* (2006.01)
*B05D 1/28* (2006.01)
(Continued)

(52) U.S. Cl.
CPC .................. *C09D 5/36* (2013.01); *B05D 1/28* (2013.01); *B05D 5/065* (2013.01); *B05D 7/536* (2013.01);
(Continued)

(58) Field of Classification Search
CPC .... C09D 5/36; C09D 5/002; C08J 5/18; C08J 7/042; B05D 7/536; B05D 5/065; B05D 1/28
(Continued)

(56) References Cited

U.S. PATENT DOCUMENTS

| 2,555,715 A | 6/1951 | Tatum |
| 4,594,374 A | 6/1986 | Stahl et al. |

(Continued)

FOREIGN PATENT DOCUMENTS

| CN | 1675002 A | 9/2005 |
| CN | 1702127 A | 11/2005 |

(Continued)

OTHER PUBLICATIONS

Notification of Reasons for Refusal dated Dec. 28, 2021, of counterpart Japanese Patent Application No. 2020-564678, along with an English translation.

(Continued)

*Primary Examiner* — Tahseen Khan
(74) *Attorney, Agent, or Firm* — Leech Tishman Fuscaldo & Lampl

(57) ABSTRACT

A multilayer color and/or effect coating on a substrate, wherein the coating includes a clearcoat layer having a dry film thickness of 10 μm to 50 μm, and the coating includes a basecoat layer having a dry film thickness of 6 μm to 35 μm, incorporating color and/or effect pigments whose orientation within the basecoat layer influences the optical properties of the coating, and the basecoat layer includes (Continued)

control particles that control the orientation of the color and/or effect pigments, wherein the control particles are characterized by a d10 of at least 50% of the dry film thickness of the basecoat layer and by a d50 of 80% to 120% of the dry film thickness of the basecoat layer, and by a d100 of not more than 200% of the dry film thickness of the basecoat layer.

10 Claims, 2 Drawing Sheets

(51) Int. Cl.
  B05D 5/06 (2006.01)
  B05D 7/00 (2006.01)
  C08J 5/18 (2006.01)
  C08J 7/04 (2020.01)
  C09D 5/00 (2006.01)
(52) U.S. Cl.
  CPC ............... *C08J 5/18* (2013.01); *C08J 7/042* (2013.01); *C09D 5/002* (2013.01)
(58) Field of Classification Search
  USPC ........................................................ 428/213
  See application file for complete search history.

(56) References Cited

U.S. PATENT DOCUMENTS

| | | | |
|---|---|---|---|
| 4,826,537 | A | 5/1989 | Ostertag |
| 4,828,826 | A | 5/1989 | Franz et al. |
| 4,840,677 | A | 6/1989 | Ostertag |
| 4,867,795 | A | 9/1989 | Ostertag et al. |
| 4,914,148 | A | 4/1990 | Hille et al. |
| 4,945,128 | A | 7/1990 | Hille et al. |
| 5,071,904 | A | 12/1991 | Martin et al. |
| 5,075,372 | A | 12/1991 | Hille et al. |
| 5,114,789 | A | 5/1992 | Reafler |
| 5,244,649 | A | 9/1993 | Ostertag et al. |
| 5,334,420 | A | 8/1994 | Hartung et al. |
| 5,342,882 | A | 8/1994 | Göbel et al. |
| 5,368,944 | A | 11/1994 | Hartung et al. |
| 5,370,910 | A | 12/1994 | Hille et al. |
| 5,387,642 | A | 2/1995 | Blum et al. |
| 5,418,264 | A | 5/1995 | Obloh et al. |
| 5,516,559 | A | 5/1996 | Röckrath et al. |
| 5,552,496 | A | 9/1996 | Vogt-Birnbrich et al. |
| 5,569,705 | A | 10/1996 | Vogt-Birnbrich et al. |
| 5,571,861 | A | 11/1996 | Klein et al. |
| 5,601,878 | A | 2/1997 | Kranig et al. |
| 5,605,965 | A | 2/1997 | Rehfuss et al. |
| 5,654,391 | A | 8/1997 | Göbel et al. |
| 5,658,617 | A | 8/1997 | Göbel et al. |
| 5,691,425 | A | 11/1997 | Klein et al. |
| 5,760,128 | A | 6/1998 | Baltus et al. |
| 6,001,424 | A | 12/1999 | Lettmann et al. |
| 6,001,915 | A | 12/1999 | Schwarte et al. |
| 6,329,020 | B1 | 12/2001 | Patzschke et al. |
| 6,372,875 | B1 | 4/2002 | Mayer et al. |
| 10,214,651 | B2 | 2/2019 | Hamm et al. |
| 2002/0119302 | A1* | 8/2002 | Fritz ............... C09D 7/69 524/494 |
| 2002/0150688 | A1* | 10/2002 | Knight ............ B41M 5/506 427/407.1 |
| 2004/0028823 | A1 | 2/2004 | Dutt |
| 2004/0138368 | A1 | 7/2004 | Ohgane et al. |
| 2004/0175572 | A1 | 9/2004 | Hintze-Bruning et al. |
| 2004/0258905 | A1 | 12/2004 | Hase et al. |
| 2011/0200818 | A1 | 8/2011 | Djunaidi et al. |
| 2017/0216881 | A1 | 8/2017 | Takaoka et al. |
| 2018/0304305 | A1 | 10/2018 | Yamane et al. |

FOREIGN PATENT DOCUMENTS

| | | |
|---|---|---|
| CN | 106170397 A | 11/2016 |
| DE | 24 46 442 | 4/1976 |
| DE | 34 09 080 | 9/1985 |
| DE | 36 36 156 | 4/1988 |
| DE | 37 18 446 | 12/1988 |
| DE | 37 19 804 | 3/1989 |
| DE | 39 30 601 | 3/1991 |
| DE | 42 04 518 | 8/1993 |
| DE | 42 22 194 | 1/1994 |
| DE | 43 28 092 | 2/1995 |
| DE | 197 41 554 | 6/1999 |
| DE | 10 2007 040 376 | 2/2009 |
| DE | 10 2015 013 400 | 4/2017 |
| EP | 0 068 311 | 1/1983 |
| EP | 0 228 003 | 7/1987 |
| EP | 0 234 361 | 9/1987 |
| EP | 0 234 362 | 9/1987 |
| EP | 0 283 852 | 9/1988 |
| EP | 0 297 576 | 1/1989 |
| EP | 0 352 298 | 1/1990 |
| EP | 0 354 261 | 2/1990 |
| EP | 0 394 737 | 10/1990 |
| EP | 0 397 806 | 11/1990 |
| EP | 0 401 565 | 12/1990 |
| EP | 0 496 205 | 7/1992 |
| EP | 0 522 419 | 1/1993 |
| EP | 0 523 610 | 1/1993 |
| EP | 0 531 510 | 3/1993 |
| EP | 0 574 417 | 12/1993 |
| EP | 0581211 | 2/1994 |
| EP | 0 584 818 | 3/1994 |
| EP | 0 590 484 | 4/1994 |
| EP | 0 594 068 | 4/1994 |
| EP | 0 594 142 | 4/1994 |
| EP | 0 521 928 | 8/1994 |
| EP | 0 634 431 | 1/1995 |
| EP | 0 649 865 | 4/1995 |
| EP | 0 669 356 | 8/1995 |
| EP | 0 678 536 | 10/1995 |
| EP | 0 543 817 | 2/1996 |
| EP | 0 593 454 | 5/1997 |
| EP | 0 708 788 | 1/2000 |
| EP | 1 423 299 | 6/2004 |
| EP | 3 178 650 | 6/2017 |
| JP | 2002-155247 A | 5/2002 |
| JP | 2003-213214 A | 7/2003 |
| JP | 2004-299220 | 10/2004 |
| JP | 2014-019064 | 2/2014 |
| WO | 95/14721 | 6/1995 |
| WO | 9 612 747 | 2/1996 |
| WO | 97/49745 | 12/1997 |
| WO | 97/49747 | 12/1997 |
| WO | 03/016095 | 2/2003 |
| WO | 2017/094680 | 6/2017 |

OTHER PUBLICATIONS

The First Office Action dated Jun. 28, 2021, of counterpart Chinese Application No. 201980033442.7, along with an English translation.

* cited by examiner

MULTILAYER COLOR AND/OR EFFECT GIVING COATING AND METHOD OF FORMING A BASECOAT LAYER

TECHNICAL FIELD

This disclosure relates to a multilayer color and/or effect giving coating comprising a clearcoat layer and a basecoat layer, and also to a method of forming the basecoat layer.

BACKGROUND

Color and/or effect giving coatings generally encompass a number of coating films applied one atop another and have different properties. In the finishing of a motor vehicle body, for example, a primer coat and/or a surfacer layer, a basecoat layer and a clearcoat layer are frequently applied in succession.

The primer coat may be deposited electrically, for example, more particularly by electrodeposition coating. Oftentimes it improves adhesion of the coating on the substrate. In metallic substrates such as the aforesaid motor vehicle body, it also has an anticorrosion function.

The surfacer layer masks unevennesses on the substrate surface to be coated, and has an elasticity that may improve the stonechip resistance of a coating. Where appropriate, the surfacer layer may also boost the hiding power and deepen the shade of the coating.

The basecoat layer carries colors and/or angle-dependent optical effects of the coating. In this context, not only the lightness, but also the color of the reflected light may vary as a function of the viewing angle, a phenomenon also referred to as lightness flop and/or color flop.

The clearcoat layer serves to strengthen the optical effects and to protect the coating from mechanical and chemical damage.

In practice it has emerged that the color and the flop behavior of the basecoat layer may be very heavily dependent on the conditions under which the basecoat layer is applied to a substrate. This is especially relevant when the basecoat layer accommodates platelet-shaped color and/or effect pigments. Orientation of these pigments within the basecoat layer may greatly influence the optical properties of the coating. If a basecoat layer is formed, for instance, via an application method such as rolling or knife coating, then the platelet-shaped pigments are oriented as a majority in one preferential direction, namely in the direction of application, within the basecoat layer. Fundamentally, within coatings technology, all application methods in which the pigments without further measures are arranged in a preferential direction are referred to as directed application methods, in contrast to undirected application methods, in which the pigments are not arranged in a preferential direction.

The basecoat layer resulting from directed application, then, comprises pigments in an anisotropic arrangement. This means that the optical properties of the basecoat layer and hence also of the coating are dependent on the viewing angle. In practice this may necessitate costly and inconvenient measures for matching the shade of painted components which immediately abut one another as parts of a motor vehicle body, for example.

Application of a basecoat layer by an undirected application method such as squirt or spray application appears to represent a simple solution to this problem. Such application methods, however, are not without their disadvantages too. With squirt or spray application it is more difficult in principle to form coating films of uniform thickness. Moreover, the coating films produced often have an uneven surface.

EP 1 423 299 B1 discloses a procedure that enables production of coatings with basecoat layers comprising platelet-shaped color and/or effect pigments, the optical properties of these pigments, however, being independent of the viewing angle. According to that procedure, a comparatively thick primary basecoat layer is first applied to a substrate by a directed application method. In a subsequent step, this primary basecoat layer is covered with a comparatively thin secondary basecoat layer, with the secondary basecoat layer being formed by an undirected application method, by spraying, for example. Surprisingly, it has been ascertained that the overall visual effect of the multi-ply basecoat layer produced in this way is dominated exclusively by the second basecoat layer. A comparatively thin partial basecoat layer with pigments in an isotropic arrangement on a comparatively thick partial basecoat layer with pigments in an anisotropic arrangement brings about the same visual impression as a single-ply basecoat layer which has pigments exclusively in an isotropic arrangement.

Disadvantages of that procedure are that applying the basecoat layer in a plurality of steps makes the coating operation more expensive, and the use of the undirected application method may result in an uneven surface of the basecoat layer.

It could therefore be helpful to provide basecoat layers comprising color and/or effect pigments, and coatings comprising such basecoat layers that reduce current challenges in the art.

The coating is a multilayer color and/or effect giving coating applied onto a substrate. It is consistently characterized by a combination of the following features:
- the coating comprises a clearcoat layer having a dry film thickness of 10 μm to 50 μm, more particularly 25 μm to 40 μm, and
- the coating comprises a basecoat layer having a dry film thickness of 6 μm to 35 μm, more particularly 10 μm to 20 μm, incorporating color and/or effect pigments whose orientation within the basecoat layer influences the optical properties of the coating.

The coating is characterized in particular in that the basecoat layer comprises so-called control particles that control orientation of the color and/or effect pigments, these control particles being characterized in turn
- by a d10 of at least 50%, preferably of at least 60%, more preferably of at least 70% of the dry film thickness of the basecoat layer and
- by a d50 of 80% to 120% of the dry film thickness of the basecoat layer, more particularly 80% to 100% of the dry film thickness of the basecoat layer, and
- by a d100 of not more than 200%, preferably of not more than 150%, more particularly of not more than 120% of the dry film thickness of the basecoat layer.

The stated numerical values are based on the entirety of all the control particles contained in the basecoat layer. This means, therefore, that the d50 of the control particles (which divides the control particles present in the basecoat layer into two partial fractions of equal size) is at least 80% and not more than 120% of the dry film thickness, not more than 10% of the control particles contained overall in the coat have a diameter which is less than 0.5 times, preferably 0.6 times, more particularly 0.7 times the dry film thickness of the basecoat layer, and the basecoat layer is free from control particles having a diameter which exceeds the dry film thickness of the basecoat layer by more than 100%, preferably by more than 50%, more preferably by more than 20%.

The diameters of the control particles are situated in general within the two-digit μm range. Within this range it is possible very reliably to determine d10, d50 and d100 values, more particularly in accordance with ISO 13320_2009 in conjunction with DIN ISO 9276-1_2004 (Representation of results of particle size analysis—Part 1: Graphical representation) and ISO 9276-2_2014 (Representation of results of particle size analysis—Part 2: Calculation of average particle sizes/diameters and moments from particle size distributions). Numerical statements relating to the diameter of control particles in the present text are values ascertained using these standards.

We surprisingly found that addition of control particles defined accordingly means that even when the basecoat layer is applied by a directed application method, it is possible to achieve an isotropic arrangement of the color and/or effect pigments. The majority of the control particles have a diameter corresponding approximately to the dry film thickness of the basecoat layer. This forces a proportion of the color and/or effect pigments to adopt an arrangement tangential to the surface of the control particles and, hence, at an angle perpendicular, for example, to the direction of application. The fewer the color and/or effect pigments that undergo orientation within the basecoat layer in a preferential direction, namely in the direction of application, the less the extent to which the optical properties of the basecoat layer and, hence, also of the coating are dependent on the viewing angle. By the control particles used, therefore, it is possible to control the visual appearance of the basecoat layer. Ideally, the control particles exclusively control the angular dependence of the shade, and do not control optical effects such as the gloss of the coating, for example.

The dry film thickness of the clearcoat layer and of the basecoat layer refers to the thickness of these coats after drying, i.e., when there is no longer any solvent present in the coats. Dry film thicknesses may be determined in particular according to DIN EN ISO 2808. Numerical statements on dry film thicknesses relate to values ascertained by this standard.

With particular preference, the clearcoat layer and the basecoat layer each have a substantially uniform dry film thickness. This means more particularly that the mean deviation in the dry film thickness is preferably less than 10% from the value determined according to DIN EN ISO 2808, for example.

The clearcoat layer and the basecoat layer of a coating, while being by definition in dried form, need not necessarily have already been cured. It may be useful to employ clearcoat and/or basecoat materials for which a drying step is followed by a separate curing step in the form of a radiation cure, for example.

The substrate may be any desired article, examples being the aforementioned motor vehicle body or a piece of furniture. With particular preference, however, the substrate is a film, more particularly a polymeric film.

In recent years, conventional coating techniques using solvent-containing liquid coating materials have increasingly been replaced, in the coating of articles, by transfer coating technologies, in which coating films are transferred from a carrier film to a workpiece. Provided for this purpose in general is a laminate of the carrier film and of the coating film or films to be transferred, this laminate being referred to as a transfer coating film, particularly in the form of a web material, having a web width of 600 mm and a web length of 700 m, for example. For application, the laminate with the coating film or the coating films is first pressed onto the workpiece that is to be coated. Beforehand, optionally, an adhesion-promoting layer may be applied to the coating side of the laminate and/or to the workpiece that is to be coated. Subsequently the carrier film is removed, with the coating film or films remaining on the workpiece. Procedures of this kind are known from DE 10 2007 040 376 A1, for example.

With particular preference, the coating is a constituent of a transfer coating film of this kind, and for this purpose is applied to a corresponding carrier film serving as a substrate. In such an example, the sequence of the transfer coating film is preferably carrier film/clearcoat layer/basecoat layer.

Particularly in transfer coating films, it may be advantageous to dry, but not yet to cure, a basecoat layer and/or clearcoat layer. Thus, for example, the coating may be converted by drying of the clearcoat layer into a non-tacky state, while retaining a high mechanical flexibility since curing has not yet taken place.

Suitable films which may serve as the substrate are known from DE 10 2007 040 376 A1, for example. Particularly suitable films consist of polymers such as fluoropolymers (e.g. ethylene-tetrafluoroethylene (ETFE)), polyethylene terephthalate, polyolefin, polycarbonate, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC), polyacrylate, polystyrene, polycarbonate/polybutylene terephthalate (PC/PBT) and/or polymethyl methacrylate.

The coating may comprise yet further layers besides the clearcoat layer and the basecoat layer, an example being the surfacer layer mentioned earlier on. Accordingly, a transfer coating film with the coating may have the sequence, for example, of carrier film/clearcoat layer/basecoat layer/surfacer layer.

Clearcoat materials contemplated for producing the clearcoat layers include not only all customary and known one-component (1K), two-component (2K) or multicomponent (3K, 4K) clearcoat materials, but also powder clearcoat materials.

Suitable 1K, 2K, 3K or 4K clearcoat materials are known from DE 4204518 A1, EP 0 594 068 A1, or EP 0 596 460 A1, for example.

As is known, 1K clearcoat materials comprise hydroxyl-containing binders and crosslinking agents such as blocked polyisocyanates, tris(alkoxycarbonylamino)triazines and/or aminoplast resins. In another example, they comprise binders in the form of polymers having pendant carbamate and/or allophanate groups, and carbamate and/or allophanate-modified aminoplast resins as crosslinking agents cf. U.S. Pat. No. 5,474,811 A or U.S. Pat. No. 5,605,965 A, or EP 0 594 068 A1 or EP 0 594 142 A1.

Essential constituents of 2K, 3K or 4K clearcoat materials are known to include hydroxyl-containing binders and polyisocyanates as crosslinking agents, which are stored separately before they are used.

Suitable powder clearcoat materials are known from DE 4222194 A1, for example.

Especially suitable are the coating materials described in WO 2009/024310 A2, comprising an OH-functional component A containing double bonds, an NCO-functional component B containing double bonds, and optionally a component C containing double bonds. Component A is preferably a polyol, and components B and C are preferably urethane acrylates.

When using 1K, 2K, 3K or 4K clearcoat materials, the solids fraction of the clearcoat materials is adjusted to exert influence both over the wet film thickness in which the clearcoat material is applied and over the dry film thickness which comes about after drying of the clearcoat material.

Suitable basecoat materials for producing the basecoat layer are basically all known solvent-containing and aqueous basecoat materials. Suitable examples are found in U.S. Pat. No. 5,114,789 A, EP 0 352 298 B1, EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574417 A1, EP 0 531 510 A1, EP 0 581 211 A1, EP 0 708 788 A1, EP 0 593 454 A1, DE 4328092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 496 205 A1, EP 0 358 979 A1, DE 2446442 A1, DE 3409080 A1, DE 19547944 A1, or DE 19741554 A1.

If necessary, the clearcoat material and/or the basecoat material, following their application and also, where appropriate, following any drying step, are cured thermally and/or by radiation. The clearcoat material and the basecoat material may optionally be cured in one step, in other words simultaneously.

The term "color and/or effect pigments" context embraces all pigments able to impart an angle-dependent shade and/or an angle-dependent optical effect to a coating film, applied by a conventional directed application method, in which they are embedded.

With particular preference the color and/or effect pigments are plated-shaped in formation. The ratio between the extent of the platelet-shaped color and/or effect pigments in a principal dimension and the thickness of the platelet-shaped color and/or effect pigments is preferably more than 3 and more particularly more than 5.

The color and/or effect pigments are preferably selected from the group consisting of organic and inorganic, colored, optical-effect, electrically conductive, magnetically shielding, or fluorescent pigments and metal powders.

With particular preference the color and/or effect pigments have an aspect ratio, i.e., a ratio of mean diameter to the mean thickness of the platelets, of >1, more preferably 2 to 2000, more particularly 3 to 1000, more preferably 3 to 100, further preferably 3 to 50.

One particularly preferred example of effect pigments are platelet-shaped aluminum flakes having an aspect ratio of 3 to 10.

Examples of suitable effect pigments are metal platelet pigments, such as commercial aluminum bronzes, aluminum bronzes chromated as in DE 3636183 A1, commercial stainless steel bronzes, nonmetallic effect pigments, such as, for example, pearlescent and/or interference pigments, platelet-shaped effect pigments based on iron oxide, or liquid-crystalline effect pigments. For details, reference is made to Rompp Lexikon Lacke and Druckfarben, Georg Thieme Verlag, 1998, page 176, "Effect pigments" and pages 380 and 381 "Metal oxide-mica pigments" to "Metal pigments", and to DE 3636156 A1, DE 3718446 A1, DE 3719804 A1, DE 3930601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A, or U.S. Pat. No. 5,244,649 A.

Examples of suitable inorganic color pigments are white pigments such as titanium dioxide, zinc white, zinc sulfide or lithopone; black pigments such as carbon black, iron-manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and α-alumina phases or chromium orange; or yellow iron oxide, nickel titanium yellow, chromium titanium yellow, cadmium sulfide, cadmium zinc sulfide, chromium yellow, or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

For further details, reference is made to Rompp Lexikon Lacke and Druckfarben, Georg Thieme Verlag, 1998, pages 180 and 181, "Iron blue pigments" to "Black iron oxide" to "Pigment volume concentration", page 563 "Thioindigo pigments", page 567 "Titanium dioxide pigments", pages 400 and 467, "Naturally occurring pigments", page 459 "Polycyclic pigments", page 52, "Azomethine pigments", "Azo pigments", and page 379, "Metal complex pigments".

Examples of suitable fluorescent pigments (daylight-fluorescent pigments) are bis(azomethine) pigments.

Examples of suitable electrically conductive pigments are carbon black and carbon nanotubes.

Examples of suitable magnetically shielding pigments are pigments based on iron oxides or chromium dioxide.

Examples of suitable metal powders are powders of aluminum, zinc, copper, bronze, or brass.

The control particles are characterized preferably by at least one of the following, and more preferably by all three of the following, properties:

the control particles are spherical or at least approximately spherical in formation: approximately spherical here is intended to mean that they have no corners and no edges and possess a maximum and a minimum diameter, with the ratio of maximum to minimum diameter being not more than 1.5, preferably not more than 1.2, more preferably not more than 1.1. Spherical, conversely, means that they possess only one diameter.

the control particles consist of a plastic, more particularly of a plastic which is stable to organic solvents such as ethyl and methyl alcohol, xylene, butyl acetate, methoxypropyl acetate.

the control particles consist of a plastic which has thermal stability up to 140° C.

The physical nature of the control particles is fundamentally unimportant. What is important, in contrast, is the above-defined relative size of the control particles in relation to the dry film thickness of the basecoat layer.

For example, the control particles may consist of an acrylate such as polymethyl methacrylate.

It is further preferred for the control particles to be unable themselves to impart either an angle-dependent shade or an angle-dependent optical effect to the basecoat layer in which they are embedded. The only outcome of their presence, preferably, is that the optical effects or shades brought about by the color and/or effect pigments are controlled.

As already mentioned, the mean diameters of the control particles as a general rule are situated in the two-digit μm range.

The color and/or effect pigments employed are preferably characterized by d50 and d100 values which are at most 5 times, preferably 3 times, more preferably 2 times the d50 and d100 values of the control particles. In certain particularly preferred embodiments, the d50 and d100 values of the control particles used are 0.1 times to 5 times, more particularly 0.1 times to 3 times.

With preference the coating is characterized by at least one of the following features, more preferably by a combination of the two following features:
the basecoat layer comprises the control particles in a fraction of 2 wt % to 15 wt % (based on the basecoat layer in the dried state, i.e., based on the solids fraction of the basecoat material from which the basecoat layer is formed).
the basecoat layer comprises the color and/or effect pigments in a fraction of 0.15 wt % to 15 wt % (based on the basecoat layer in the dried state, i.e., based on the solids fraction of the basecoat material from which the basecoat layer is formed).

Our method produces a basecoat layer, more preferably produces the basecoat layer of the multilayer coating described above. Accordingly, the components necessary to produce the basecoat layer (basecoat material, color and/or effect pigments, control particles) are also selected from those described above. The method always comprises the following three steps:
providing a basecoat material,
applying the basecoat material to a substrate to form a basecoat film, and
drying and/or curing the basecoat film to form the basecoat layer.

This basecoat material in general always comprises:
the color and/or effect pigments whose orientation within the basecoat layer influences the optical properties thereof, and
the control particles for controlling the orientation of the color and/or effect pigments in the basecoat layer that is to be produced.

Most of the time, especially when using the 1K, 2K, 3K or 4K clearcoat materials described, the basecoat material comprises the stated components plus a solvent.

The solids fraction of the basecoat material and/or the thickness of the basecoat film are/is adjusted such that the basecoat layer is obtained with a dry film thickness of 6 μm to 35 μm.

Furthermore, in agreement with the observations above concerning the coating, control particles used comprise particles characterized
by a d10 of at least 50% of the dry film thickness of the basecoat layer and
by a d50 of 80% to 120% of the dry film thickness of the basecoat layer, more particularly 80% to 100% of the dry film thickness of the basecoat layer, and
by a d100 of not more than 200%, preferably of not more than 150%, more particularly of not more than 120% of the dry film thickness of the basecoat layer.

The control particles used need by no means necessarily have a monomodal distribution. Instead, indeed, it may be advantageous to employ two or more control particle fractions each having a different d50, and possibly a different d10 and/or d100. It is possible, for example, to employ a first control particle fraction having a d50 of 80% of the dry film thickness of the basecoat layer, and a second, same-size control particle fraction having a d50 of 100% of the dry film thickness of the basecoat layer. In that example the d50 of the entirety of the control particles in the basecoat layer is 90% of the dry film thickness of the basecoat layer.

The substrate is preferably one of the substrates stated above. In one preferred example the substrate is a film to which a clearcoat layer has already been applied. In general, however, it is preferred for the basecoat layer to be applied to the film first, and then the clearcoat layer.

The basecoat material is applied with particular preference using a directed application method. Suitable such methods include, in particular, application by casting, knife coating, rolling on, or extrusion coating. These methods may be carried out with customary and known apparatus such as casting apparatus, coating knives, rolls, especially contrarotating rolls, or extruders, especially film extruders.

BRIEF DESCRIPTION OF THE DRAWINGS

FIG. 1 shows a prior art basecoat layer 101 applied to a substrate 100. The basecoat layer 101 has been formed by knife application, in other words by a directed application method. Embedded in the basecoat layer 101 as color and/or effect pigments are platelet-shaped metal flakes 102. As a result of the directed application method, these flakes are all arranged in a preferential direction, namely in the direction of application (arrow). Incident light is reflected in the same way by all the metal flakes 102. The chromatic and visual appearance of the basecoat layer 101 is therefore heavily angle-dependent.

FIG. 2 shows a prior art basecoat layer 201 applied to a substrate 200. The basecoat layer 201 has been formed by spray application, in other words by an undirected application method. Embedded in the basecoat layer 201 as color and/or effect pigments are platelet-shaped metal flakes 202. As a result of the undirected application method, these flakes are substantially less ordered than the metal flakes according to FIG. 1. Incident light is not reflected in the same way by all the metal flakes 202. The chromatic and visual appearance of the basecoat layer 201 is therefore much less heavily angle-dependent than in FIG. 1.

FIG. 3 shows an example of a basecoat layer 301 applied to a substrate 300. The basecoat layer 301 has been formed by knife application, in other words by a directed application method. Embedded in the basecoat layer 301 as color and/or effect pigments are platelet-shaped metal flakes 302. In spite of the directed application method, these flakes are not all arranged in a preferential direction, namely in the direction of application. Such an arrangement is prevented by the spherical control particles 303, which, like the metal flakes 302, are embedded in the basecoat layer 301. The control particle 303 has a diameter corresponding approximately to the thickness of the basecoat layer 301. This forces some of the metal flakes 302 to adopt an arrangement parallel to the surface of the control particles 303 and therefore at a slant or even perpendicular to the direction of application (arrow). The chromatic and visual appearance of the basecoat layer 301 is therefore significantly less heavily angle-dependent than in FIG. 1.

FIG. 4 is a detail of a micrograph of a section through a basecoat layer 401, formed according to our method on a substrate 400 by a directed application method, and covered with a clearcoat layer 404. Embedded in the basecoat layer 401 as color and/or effect pigments are metal flakes 402, and also the control particle 403. The control particle 403 has a diameter corresponding approximately to the thickness of the basecoat layer 401. It is readily apparent that the metal flakes 402 are forced by the control particle into a slanted orientation.

Figure 1:
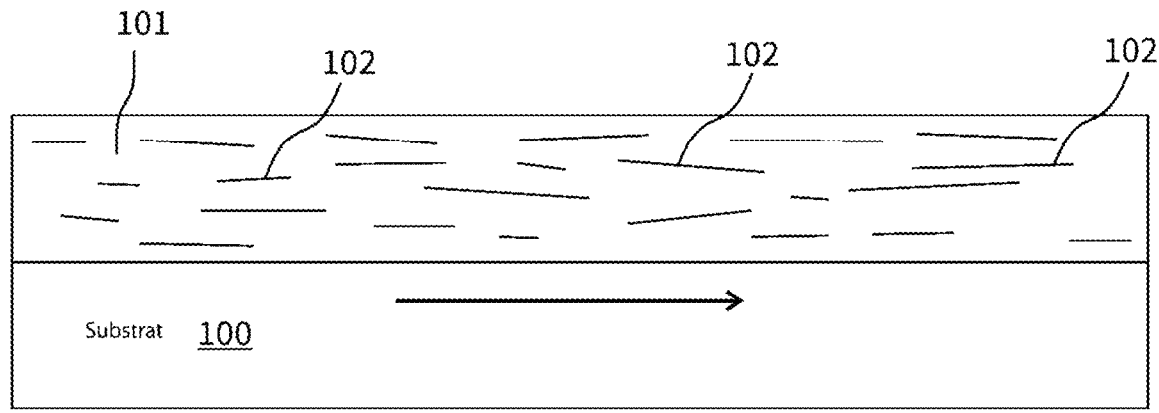
FIG. 1 shows a schematic cross section of a prior art basecoat layer applied to a substrate.
Figure 2:
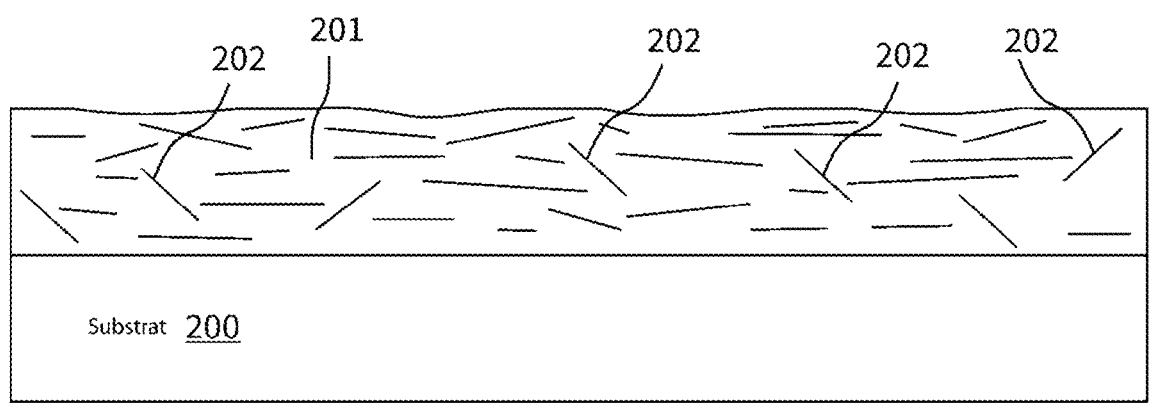
FIG. 2. Shows a schematic representation of another example of a prior art structure similar to that shown in FIG. 1.
Figure 3:
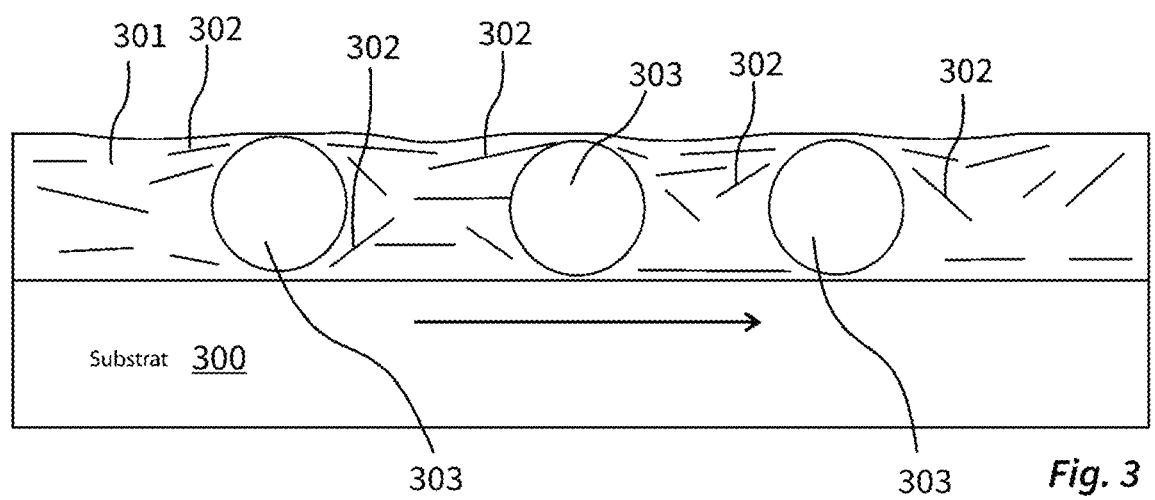
FIG. 3 shows a schematic representation of an example of our basecoat layer applied to a substrate.
Figure 4:
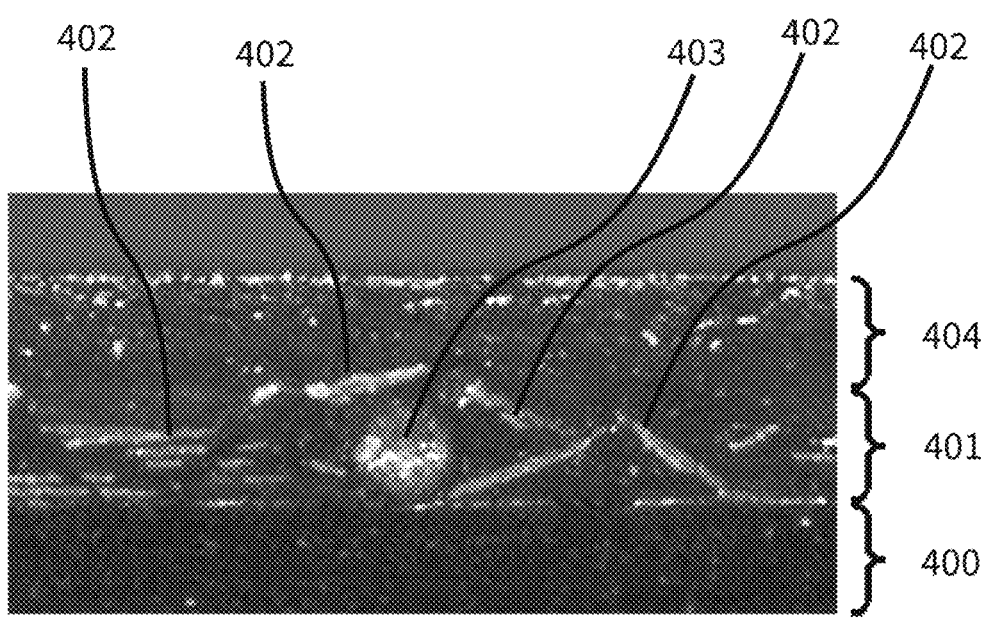
FIG. 4 is a micrograph of a section taken through an example of our basecoat.

EXAMPLES (A) Atop a primed metal substrate, a basecoat material having a solids fraction of 25% was applied by a coating knife in a wet film thickness of 60 μm. The basecoat material comprised a polyurethane-based binder, an additive mixture, and water as dispersion medium. Besides these, it contained a fraction of 2 wt % of an organic color pigment and also 2 wt % of aluminum flakes as effect pigment (the weight figures in this example are based on the basecoat material as a whole, hence including dispersion medium and/or solvent present). The mean diameter (d50) of the aluminum flakes was 10 μm. The particles of the organic color pigment all had sizes below 1 μm. Drying gave a basecoat layer having a dry film thickness of 15 μm.

(B) Atop a primed metal substrate, a basecoat material having a solids fraction of 35% was applied by a coating knife, likewise in a wet film thickness of 60 μm. The basecoat material had a composition identical to that of the basecoat material used in Example A, with one exception: further to the aluminum flakes, it contained spheres of polymethyl methacrylate having a mean diameter (d50) of 15 μm, in a fraction of 1 wt % (this weight figure as well is based on the basecoat material as a whole, hence including dispersion medium and/or solvent present). These spheres are control particles.

An optical comparison of the basecoat layers obtained per Examples A and B revealed that the basecoat layer produced according to Example A, as expected, showed a heavily angle-dependent shade. The basecoat layer produced according to Example B, conversely, showed a significantly reduced angular dependence.

The invention claimed is:

1. A multilayer color and/or effect coating on a substrate, comprising:
   a. a clearcoat layer having a dry film thickness of 10 μm to 50 μm, and
   b. a basecoat layer having a dry film thickness of 6 μm to 35 μm, incorporating color and/or effect pigments whose orientation within the basecoat layer influences optical properties of the coating, and
   c. wherein the basecoat layer comprises control particles that control the orientation of the color and/or effect pigments,
   wherein the control particles are spherical in formation and comprise
   d. a d10 of at least 50% of the dry film thickness of the basecoat layer and
   e. a d50 of 80% to 120% of the dry film thickness of the basecoat layer, and
   f. a d100 of not more than 200% of the dry film thickness of the basecoat layer; and
   wherein the substrate is a polymeric film.

2. The coating as claimed in claim 1, wherein the control particles comprise plastic that is stable to organic solvents selected from ethyl alcohol and methyl alcohol, xylene, butyl acetate and methoxypropyl acetate.

3. The coating as claimed in claim 1, wherein the basecoat layer comprises the control particles in an amount of 2 wt % to 15 wt %.

4. The coating as claimed in claim 1, wherein d50 of the color and/or effect pigments is not more than 5 times the d50 of the control particles.

5. A method of forming a basecoat layer comprising:
   a. applying a basecoat material to a polymeric film to form a basecoat film, wherein the basecoat material comprising color and/or effect pigments whose orientation within the basecoat layer influences the optical properties thereof, and control particles for controlling the orientation of the color and/or effect pigments in the basecoat layer, and
   b. drying and/or curing the basecoat film to form the basecoat layer,
   wherein
   c. the solids fraction of the basecoat material and/or the thickness of the basecoat film are/is adjusted such that the basecoat layer is obtained with a dry film thickness of 6 μm to 35 μm, and
   d. the control particles are spherical in formation and comprise
      a d10 of at least 50% of the dry film thickness of the basecoat layer,
      a d50 of 80% to 120% of the dry film thickness of the basecoat layer, and
      a d100 of not more than 200% of the dry film thickness of the basecoat layer.

6. The method as claimed in claim 5, wherein the basecoat material is applied with a directed application method.

7. The method as claimed in claim 5, wherein the control particles are added to bring about an isotropic arrangement of the color and/or effect pigments in the basecoat layer by minimizing the effect of the viewing angle on the visual appearance of the basecoat layer.

8. The coating as claimed in claim 1, wherein the color and/or effect pigments in the basecoat layer are in an isotropic arrangement so that the effect of the viewing angle on the visual appearance of the basecoat layer is minimized.

9. The coating as claimed in claim 1, wherein the control particles comprise plastic that has a thermal stability up to 140° C.

10. The coating as claimed in claim 1, wherein the basecoat layer comprises the color and/or effect pigments in an amount of 0.15 wt % to 15 wt %.

* * * * *